June 25, 1957  J. W. JACOBSON ET AL  2,796,879
LIQUID FLOW CONTROL APPARATUS
Filed Aug. 28, 1953
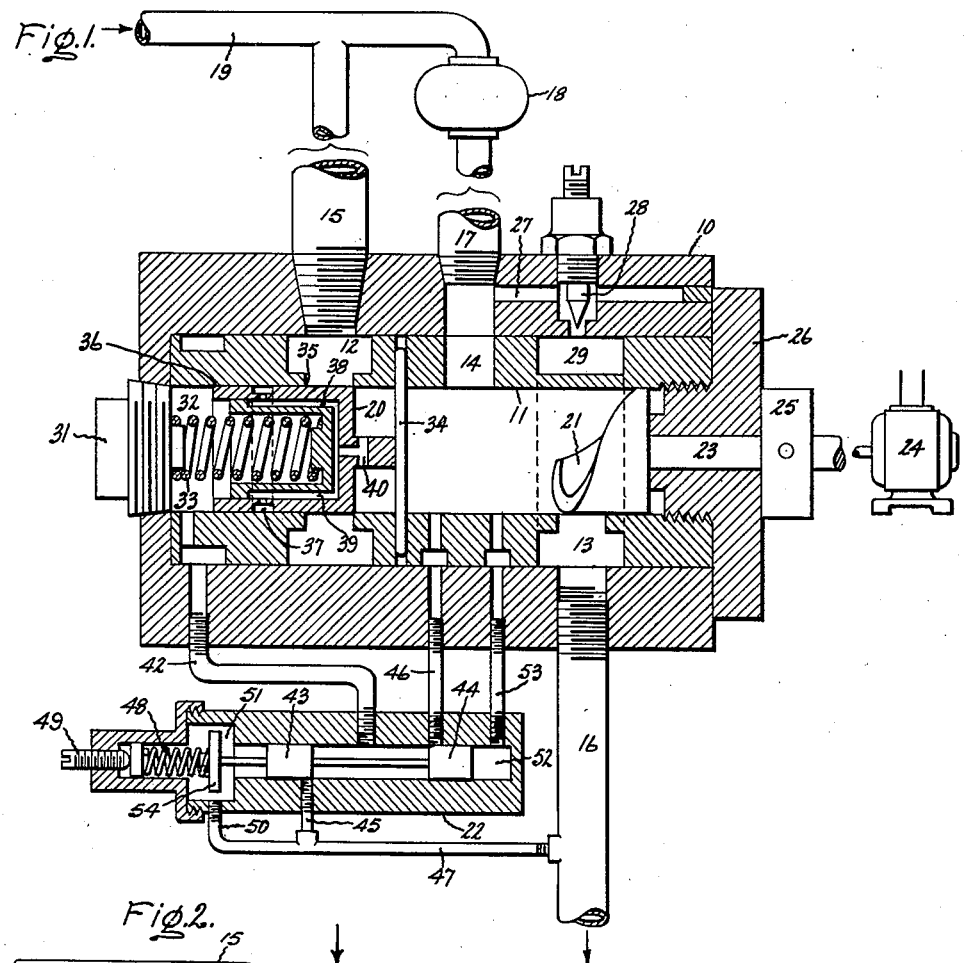
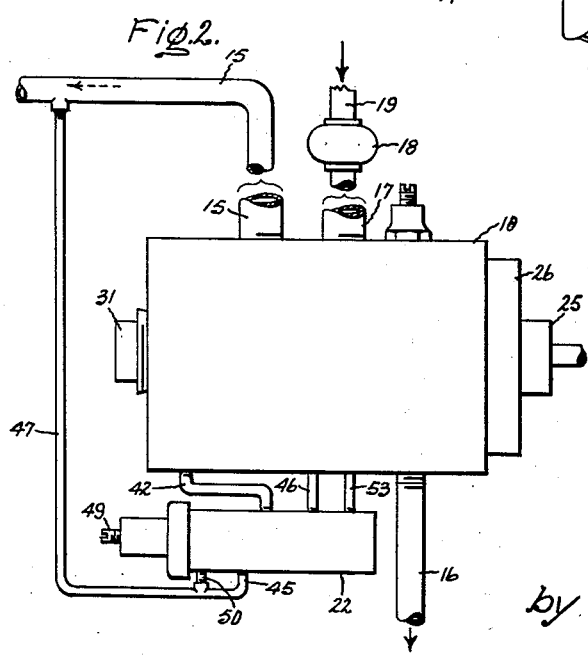
Inventors:
John W. Jacobson,
Robert S. Binford,
by
Their Attorney.

United States Patent Office 2,796,879
Patented June 25, 1957

2,796,879

LIQUID FLOW CONTROL APPARATUS

John W. Jacobson and Robert S. Binford, Schenectady, N. Y., assignors to General Electric Company, a corporation of New York Application August 28, 1953, Serial No. 377,116

9 Claims. (Cl. 137—87)

This invention relates to apparatus for the control of flow of liquids in a liquid delivery system and more particularly to such systems of the type which may employ apparatus for the measurement and control of a pressure drop within the system.

In liquid flow control apparatus where liquid flow is to be controlled in a very precise manner it is sometimes appropriate to control the movement of a flow throttling valve member to maintain a very precise value of a difference in system pressures which may be controllable by the position of the valve member. Other operating conditions may vary over a wide range.

Accordingly, it is one object of the present invention to provide a system for maintaining a predetermined pressure difference, by control of a flow throttling valve member, which is characterized by greatly improved accuracy with which the pressure difference is maintained, though other operating conditions may be highly variable.

One preferred structure which may be provided to carry out the above object employs a pilot valve which is connected to measure the pressures, the difference of which it is desired to maintain and to balance the higher pressure against the lower pressure by means of a mechanical spring. Displacement of the pilot valve in response to a pressure difference error causes flow of pressure liquid into or out of a control pressure chamber which determines the position of a liquid flow control valve member to thereby maintain the desired pressure difference or "drop."

The accuracy of this system theoretically depends on the principle that under all static conditions, no matter what the degree of opening of the flow control valve may be, the pilot valve is theoretically in the centered position in which no corrective flow to or from the control pressure chamber is required. Therefore, the force displacement gradient of the mechanical spring which determines the pressure drop calibration does not introduce any variation or error in the pressure drop actually maintained. Unfortunately, the control pressure chamber, which is defined partly by the movable flow control valve member is not leakproof and even under static conditions therefor the liquid leakage to or from the control pressure chamber around the valve member must be compensated for by an off center or corrective position of the pilot valve, thus introducing a pilot valve spring gradient error. If the leakage to or from the control pressure chamber can be maintained at approximately a constant value, however, the displacement of the pilot valve under static operating conditions to compensate for the control pressure leakage will remain constant and the pilot valve spring gradient error can therefore be adjusted for and will not be troublesome.

Accordingly, it is a further object of this invention to provide an improved piloted pressure drop maintaining flow control system providing for substantially constant pilot valve displacement under static operating conditions by maintenance of substantially constant leakage to or from a control pressure chamber controlled by the pilot valve.

Another object of the present invention is to provide a leakage path of a constant length between the walls of a piston valve member and the cylinder in which it is mounted.

Another object of the invention is to provide a piston mounted within a cylinder having a leakage path to or from a control pressure chamber partially defined by the piston, the path communicating with an enclosure at a pressure having a definite relationship to the control pressure chamber pressure.

Other objects and advantages of the invention will become apparent from the following specification and the accompanying drawings.

One preferred structure which may be employed in carrying out the objects of this invention includes a flow control valve member positioned in response to liquid pressure within a control pressure chamber, the pressure within the control pressure chamber being under the control of a spring biased pilot valve which in turn is positioned in response to two liquid pressures for which a substantially constant difference is to be maintained by movement of the flow control valve element. The flow control valve element may be in the form of a piston which is variably axially positioned to maintain various openings of a flow control port upon the side of the piston opposite to the control pressure chamber. A certain portion of the valve piston always extends between the port controlled by the piston and the control pressure chamber. This last-named portion of the piston contains a circumferential groove on the piston exterior. A passage extends from the groove through the interior of the piston body to communicate with one of the two pressures between which the constant pressure difference is to be maintained.

For a better understanding of the invention reference should be made to the following specification and the accompanying drawings in which:

Fig. 1 is a schematic diagram, partly in section, showing a preferred flow control apparatus for carrying out the objects of this invention, and Fig. 2 is a similar view of an alternative embodiment or modification of the system of Fig. 1.

Referring more particularly to Fig. 1, there is shown a valve housing 10 having a cylindrical bore 11 therein. Within the housing 10 and communicating with the bore 11 are two outlet chambers or ports 12 and 13 and an axially intermediately positioned inlet chamber or port 14. Each of these three ports is in communication with one of three separate liquid conduits respectively designated 15, 16 and 17. Inlet conduit 17 is connected to a suitable liquid pump 18 which is indicated schematically as a fixed displacement gear pump. The pump 18 may be supplied with liquid from a suitable reservoir (not shown) through a pump inlet conduit 19.

The liquid forced by pump 18 through the conduit 17 and the inlet port 14 to the bore 11 is exhausted through either or both of the exhaust ports 12 and 13. The size of the opening at exhaust port 12 is controlled by a reciprocable flow control piston valve element 20 and the opening at port 13 is controlled by a rotatable valve element 21.

A pilot valve 22 is provided for maintaining a constant pressure drop across the valve element 21 by control of the position of valve element 20. The opening of exhaust port 12 by valve element 20 provides for a decrease in the pressure of liquid within the bore 11 as supplied from inlet port 14 since the discharge conduit 15 is connected from the port 12 to the pump inlet conduit 19, thus forming a low resistance recirculating path through the pump 18. The conduit 16 may be connected to apparatus (not shown) to which the liquid is supplied. The valve element 21 may be rotated to set various desired orifices at discharge port 13 by means of an operating shaft 23 and a suitable positioning motor such as the electric motor 24 which is shown. The motor 24 may be suitably energized for rotation in either direction to obtain desired adjustments in the liquid flow by adjustment of the discharge orifice at port 13. A suitable collar 25 may be fastened to the shaft 23 by means of a set screw to hold the valve element in the axial position shown. The shaft 23 is journaled in an end cap or plug 26 which also forms a closure for the bore 11. As will be seen by the drawing, the valve element 21 includes a skirt portion which extends varying distances to the left in the drawing, forming a cam-like surface which may have a shape to provide any desired orifice opening characteristic as a function of angular rotation.

It is a well-known fact that the volume or rate of flow through an orifice is a function of both the size of the orifice and of the pressure drop occurring by reason of the flow through the orifice or the difference in pressure between the upstream and downstream sides of the orifice. Accordingly, in the present system, by maintaining the pressure drop across the orifice at port 13 at a constant value by automatic adjustment of the valve element 20 to control the rate of bypassage of liquid through the bypass conduit 15, the rate of flow is made to be directly dependent upon the orifice at port 13 as controlled by the valve element 21, and a given position of the valve element 21 therefore provides an entirely consistent and predictable rate of liquid flow.

A passage 27 may be provided, including an adjustable orifice member 28, which connects through a circumferential passage 29 to the discharge port 13. This additional passage in parallel with the orifice at port 13 provides for a certain minimum flow even though valve element 21 may completely close the orifice 13, and also provides a very fine calibration adjustment of the system to provide exactly the desired amount of flow for a given position of the valve element 21.

The left end of the bore 11 is closed by a suitable plug 31 which, together with valve element 20, defines a control pressure chamber 32. A low force spring 33 is provided within the control pressure chamber 32 extending between a central positioning protrusion on the interior surface of plug 31 and the valve element 20 for biasing valve element 20 to the right against a stop in the form of a pin 34 which extends across the central portion of bore 11 as shown. When valve element 20 is biased to the extreme right-hand position against the stop 34 by spring 33 as shown, the bypass discharge port 12 is completely closed by the valve element 20. In this position, there is a skirt portion of valve element 20 between the points 35 and 36 which is necessarily at all times positioned to the left of the opening of discharge port 12. Within this last-named portion of the valve element 20 in the axial space between points 35 and 36, there is a circumferential groove 37 which is connected by means of internal valve passages 38 and 39 and a terminal passage 40 with the interior of bore 11 and thereby the inlet orifice 14 and the discharge pressure of pump 18. The function of groove 37 and the associated passages will be described more fully below.

The liquid pressure within control pressure chamber 32 is determined and controlled through a conduit 42 which is connected to the central portion of pilot valve 22. The pilot valve 22 includes a spring biased piston having valve lands 43 and 44 which respectively control the openings of pilot valve ports which terminate liquid conduits 45 and 46. The conduit 45 connects through a conduit 47 with the low pressure discharge conduit 16, and the conduit 46 connects to the portion of valve bore 11 which communicates directly with the inlet port 14 and the pump 18. Thus, a displacement of the pilot valve piston to the right in the diagram, causing pilot valve land 44 to uncover the port terminating conduit 46 connects inlet pressure through conduit 46, the pilot valve, and conduit 42 to the control pressure chamber 32, thus raising the pressure within chamber 32. Conversely, displacement of the pilot valve to the left causes opening of the port associated with valve land 43 to cause a lowering of the liquid pressure within chamber 32 by means of a connection through conduit 42, the pilot valve, and the pilot valve conduits 45 and 47 to discharge conduit 16.

The pilot valve piston is normally biased to the right in the diagram by a biasing spring 48, the compression of which may be adjusted by a suitable set screw 49. The pilot valve is additionally biased to the right by the pressure of liquid from the outlet conduit 16 conveyed through the conduit 47, a conduit 50, and an end chamber 51 which contains the biasing spring 48, to the left end of the valve land 43. Similarly, the pilot valve is biased to the left in the diagram by liquid pressure applied to the opposite end chamber 52 and to the right end of valve land 44 through another conduit 53 which communicates with the central portion of the valve bore 11 and thus with the discharge pressure of pump 18. The pilot valve piston also has an enlarged end portion 54 in the chamber 51 which provides a dashpot characteristic to dampen transient movements.

It will be seen from the above, that the pilot valve piston will be maintained in the centered position which is shown, in which the ports at both valve lands 43 and 44 are in a closed condition, by a balance of the force of spring 48 plus the discharge pressure conveyed by conduit 50 versus the inlet pressure of chamber 52 conveyed by conduit 53. The pilot valve 22 thus measures the liquid pressure drop which occurs at the discharge port 13. If the pressure drop becomes larger than is called for by the calibration of the pilot valve 22 as provided by the adjustment of spring 48, the pilot valve piston is moved to the left, opening the port associated with valve land 43, lowering the control pressure within the control pressure chamber 32, and thus permitting piston 20 to move to the left to open the discharge port 12, relieving the high liquid pressure of the central portion of the cylinder bore 11 to re-establish the desired pressure drop value. Conversely, a pressure drop value of a lesser magnitude causes a movement of the pilot valve piston to the right, causing a greater pressure within control pressure chamber 32 and a partial closure of the port 12 by piston 20 to re-establish the desired pressure drop value.

It is a well recognized and obvious fact that a piston such as piston 20, which is positioned for reciprocable movement within a cylinder and which is arranged to confine liquids or other fluids under pressure such as in the pressure chamber 32, will be subject to a certain amount of liquid leakage. If the annular groove 37 and the passages 38, 39 and 40 are disregarded, the normal leakage path from the control pressure chamber 32 around the piston 20 is along the outer piston wall to the discharge port 12. Port 12 is at substantially zero pressure since it is connected through conduit 15 to the pump inlet conduit 19. Obviously, any leakage to or from the control pressure chamber 32 must be compensated for during steady static operation of the system by a continuous displacement of the pilot valve piston to permit replenishment or relief of the liquid which may leak out of or in to the control pressure chamber 32. If the leakage is at a substantially constant rate, the required displacement of the pilot valve and the consequent change in the spring force provided by calibration spring 48 may be compensated for by adjustment of adjusting screw 49 to obtain a consistent operating characteristic. However, if the leakage rate to or from the control pressure chamber 32 is caused to vary over any appreciable range, then the static displacement of the pilot valve to compensate for this leakage will likewise vary and the point of operation of the pilot valve as it changes will subject the pilot valve to varying forces from spring 48 due to the spring gradient, causing a "regulation" in the value of pressure difference or pressure drop which is held by the system.

There are two major factors which can cause variations in the rate of leakage. One is a variation in the position of piston 20 as required for various openings of the port 12 which causes varying leakage path lengths between the left end of the piston 20 and the left edge of the port 12. The other factor is a shift in pressure levels which may occur due to varying back pressures on the system discharge conduit 16.

The variation in the level of back pressure in discharge conduit 16 is effective in causing a variation in leakage from control pressure chamber 32 for the following reasons. From the foregoing description, it will be obvious that the absolute value of the pressure within control pressure chamber 32 will always be in a range between the absolute value of the inlet pressure at port 14 and the discharge pressure at port 13. For efficient operation of the system, the design constants may preferably be chosen so that the absolute pressure held within control pressure chamber 32 may be approximately midway between the inlet and discharge pressure values. Accordingly, if the back pressure on discharge conduit 16 varies, it will be obvious that since the system holds a constant pressure drop between the inlet port 14 and the discharge port 13, the inlet pressure will likewise vary to correspond to the discharge conduit pressure, as will the pressure within the control pressure chamber 32. In some applications for which the apparatus of the subject invention may be employed, the back pressure on discharge conduit 16 may vary over as high a range as ten to one, expressed as a ratio between maximum and minimum values. If the discharge pressure in conduit 16 varies over such a wide range, the control pressure within chamber 32 will therefore obviously vary over a similarly wide range and the leakage from chamber 32 to the discharge port 12 which, as stated above is at substantially zero pressure will likewise vary over a wide range. Corresponding changes in the static operating position of the pilot valve 22 will thus be demanded, with resulting changes and errors in the operating characteristic of the system. Similar difficulties may be encountered with variations in the pressure of bypass conduit 15.

The annular groove 37 and the associated passages 38, 39 and 40 are therefore provided to overcome these difficulties by serving as a path for leakage liquid from the control pressure chamber 32. The leakage path therefore has a constant length, which is the distance between the groove 37 and the point 36, and a substantially constant leakage path pressure drop. The constant leakage path pressure drop is provided because the substitute leakage liquid connection provided by the passages 38, 39 and 40 connects between the central portion of bore 11 which is at the inlet pressure of port 14 so that the leakage liquid flow is from the higher inlet pressure within this central portion of bore 11, through the passages 40, 38 and 39 to the groove 37 and through the leakage path into the pressure chamber 32. Since the leakage is between the inlet pressure of port 14 and the pressure of the control pressure chamber 32, both of which vary in dependence upon the discharge conduit back pressure as described above, the pressure drop across the leakage path between the groove 37 and the point 36 of the piston 20 is substantially at a constant value which may correspond to approximately half of the value of the pressure difference or pressure drop maintained by the system across the discharge orifice at port 13. With a constant leakage path length and pressure drop, the control pressure chamber leakage will remain substantially constant.

As mentioned above, when the leakage for the control pressure chamber 32 can be maintained at substantially a constant value, the compensating static displacement of the piston of pilot valve 22 remains at approximately the same value under all displacement conditions of piston 20 and all system discharge pressure conditions. Therefore, any displacement of the pilot valve system which is required to compensate for the control pressure chamber leakage may be in turn compensated for by adjustment of the pilot valve spring adjusting screw 49. Operation at the same static deflection of pilot valve calibration spring 48 is thereby attainable, resulting in the maintenance of a very accurate pressure difference or pressure drop value by the system.

It will be obvious that the features of the present invention may be embodied in modifications of the pressure drop maintaining system of Fig. 1. For instance, as shown in the modification of Fig. 2, the discharge conduit 15 pressure may be measured as the lower of the two pressures between which the pressure drop is to be maintained, and the discharge conduit 15 may be connected either to the pump inlet conduit 19 as shown in Fig. 1, or to other separate apparatus to which liquid is to be supplied as indicated but not shown in Fig. 2. In this modification, the adjustments of the reciprocable piston 20 under the control of the pilot valve 22 directly controls the liquid pressure drop across the valve 20 itself. The existence of the discharge conduit 16 and of the orifice provided at the discharge port 13 is immaterial and optional as long as an appreciable restriction to flow or back pressure for conduit 16 is present. In all other respects, the modified system of Fig. 2 may be substantially the same as that shown for Fig. 1.

While we have described and illustrated by way of example only certain embodiments of our invention in the foregoing, many modifications will occur to those skilled in the art and it therefore should be understood that the appended claims are intended to cover all such modifications as fall within the true spirit and scope of the invention.

What we claim as new and desire to secure by Letters Patent of the United States is:

1. A liquid flow delivery system comprising a throttle valve having a valve casing with an inlet conduit and two discharge conduits for respectively receiving and discharging liquid under pressure, a separate valve element associated with each of said discharge conduits for controlling the liquid flow thereto in accordance with the position thereof, a pilot valve connected to control the position of one of said valve elements in accordance with a variable liquid control pressure, said pilot valve including connections to said inlet conduit and to one of said discharge conduits for positioning in response to the pressure difference between said inlet conduit and said one discharge conduit to maintain said pressure difference at a constant value by control of the position of said one valve element.

2. A liquid delivery apparatus comprising a housing having a cylindrical bore therein, said housing including at least two discharge ports communicating with said bore, said housing also including an inlet port for the reception of liquid under pressure communicating with said bore at an axial position intermediate said discharge ports, a throttle valve element arranged for rotation within said bore adjacent to one of said discharge ports, said throttle valve element including a skirt portion extending varying axial distances across the associated port at various circumferential positions thereof for varying the flow restricting orifice provided by said valve element in cooperation with said port according to a predetermined function of the rotation of said valve, a pressure responsive valve element arranged for axial movement within said bore for variably covering said other discharge port, and a pilot valve including pressure connections to said inlet port and to one of said discharge ports for controlling the position of said pressure responsive valve element in response to the difference between said inlet and discharge port pressures.

3. A liquid delivery apparatus comprising a housing having a cylindrical bore therein, said housing including at least two discharge ports communicating with said bore, said housing also including an inlet port for the reception of liquid under pressure communicating with said bore at an axial position intermediate said discharge ports, a throttle valve element arranged for rotation within said bore adjacent to one of said discharge ports, said throttle valve element including a skirt portion extending varying axial distances across the associated port at various circumferential positions thereof for varying the flow restricting orifice provided by said valve element in cooperation with said port according to a predetermined function of the rotation of said valve, a pressure responsive valve element arranged for axial movement within said bore for variably covering said other discharge port, the end portion of said bore adjacent said last named valve element defining a control pressure chamber, a pilot valve connected to admit and discharge liquid from said control pressure chamber, said pilot valve including pressure connections to said inlet port and to one of said discharge ports for controlling the position of said pressure responsive valve element in response to the difference between said inlet and discharge port pressures.

4. Hydraulic apparatus comprising a housing defining an enclosed cylinder therein, a piston reciprocably mounted within said cylinder and dividing said cylinder into first and second chambers separated by said piston, said housing defining a third chamber having a port positioned for variable opening into said first chamber by movement of said piston, said piston including an annular circumferential groove in a portion of the exterior surface thereof axially displaced toward said second chamber from the portion normally covering said port for providing a constant flow leakage path for said second chamber, said piston also including passage means connecting said groove to another of said chambers.

5. Liquid flow delivery apparatus comprising a housing enclosing a cylindrical cavity therein, a piston reciprocably mounted within said cylinder for division thereof into separate chambers, said housing including at least one inlet and one discharge port communicating with said cylinder, one of said ports being positioned for variable opening by movement of said piston, said piston including an annular circumferential groove in a portion of the exterior surface thereof axially displaced from the portion normally covering said associated port for providing a constant flow leakage path for the one of said chambers adjacent to said axially displaced portion, said piston also including an interior passage connecting said groove to the other of said chambers.

6. A liquid flow delivery system comprising a housing having a bore therein, said housing including inlet and discharge conduits terminating in ports communicating with said bore, a pressure responsive valve element positioned for reciprocating movement within said bore for varying the opening of one of said ports, a closure for a portion of said bore adjacent to said element to define a control pressure chamber therebetween, a stop member extending into said bore on the side of said element opposite said chamber for the prevention of substantial movement thereof beyond the fully closed position, said element including a portion extending along said bore beyond the associated port toward said chamber when restrained by said stop member, said element including a peripheral opening in said last-named portion thereof and a passage from said opening to one of said ports, a pilot valve connected to control the pressure within said chamber, said pilot valve being spring biased in a first direction, and connections for positioning said pilot valve in response to a pressure difference controllable by the positioning of said element.

7. Apparatus for the control of liquid flow comprising a housing having an internal bore and a plurality of ports connected therewith, at least two of said ports being respectively connected as an inlet and discharge for liquid under pressure, a pressure responsive valve member within said bore to variably close at least one of said ports in accordance with the axial position thereof, said housing including a bore closure to define a control pressure chamber with said valve member, a pilot valve connected to control the admission and discharge of liquid to said control pressure chamber to thereby adjust the pressure therein and the resulting position of said valve member, said pilot valve including connections for the detection of the pressures within said inlet and discharge ports for positioning thereof in response thereto, said valve member including a portion extending beyond the adjacent portion of the associated port in the direction of said control pressure chamber for all operating positions thereof, said valve member including an annular groove in the exterior of said last-named portion thereof and a passage therein from said groove in communication with one of said ports.

8. A liquid flow delivery system comprising a housing having a bore therein, said housing including inlet and discharge conduits terminating in ports communicating with said bore, a pressure responsive valve member positioned for reciprocating movement within said bore for varying the opening of one of said ports to said bore, a closure for a portion of said bore adjacent to said pressure responsive valve member to define a control pressure chamber therebetween, a stop member extending into said bore for the prevention of substantial movement of said valve member beyond the fully closed position in the normally closing direction, said valve member including a portion extending axially along said bore on the side of said valve member opposite said stop member beyond the associated port when said valve member is restrained by said stop member, said valve member including a peripheral opening to the wall of said bore in said last named portion thereof and a passage communicating between said peripheral opening and one of said ports, a pilot valve connected to control the pressure within said control pressure chamber, said pilot valve being spring biased in a first direction, and connections for the positioning of said pilot valve in response to a difference between two pressures controllable by the positioning of said pressure responsive valve member, the lower and higher of said two pressures being respectively connected to bias said pilot valve in said first direction and in the opposite direction.

9. An apparatus for the control of liquid flow to maintain a substantially constant pressure difference between an inlet and a discharge pressure comprising a housing having an internal bore and a plurality of ports connected therewith, at least one of said ports being connected as an inlet for liquid under pressure and at least one of said remaining ports being connected for discharge of liquid under pressure, a flow restricting structure between said two last-mentioned ports, a pressure responsive valve member axially positionable within said bore to variably close at least one of said ports in accordance with the position thereof, said housing including a closure of said bore to define a control pressure chamber with said valve member, a pilot valve connected to adjust the fluid pressure within said control pressure chamber in accordance with the displacement thereof from a central null position, said pilot valve including connections for the detection of the pressure differences within said inlet and discharge ports for positioning thereof in response thereto, said pressure responsive valve member including a portion extending beyond the adjacent portion of the associated port in the direction of said control pressure chamber for all of the effective operating positions thereof, said pressure responsive valve member including a passage in communication with one of said ports and an annular groove in the exterior of said last-named portion thereof connected to said passage.

References Cited in the file of this patent

UNITED STATES PATENTS

| | | |
|---|---|---|
| 1,467,522 | Amsler | Sept. 11, 1923 |
| 2,406,899 | Pugh et al. | Sept. 3, 1946 |
| 2,661,756 | Noon et al. | Dec. 8, 1953 |